United States Patent
Wegleitner et al.

(10) Patent No.: US 7,054,698 B2
(45) Date of Patent: May 30, 2006

(54) SYSTEM FOR TRACKING OPERATOR CERTIFICATION OF FAB EQUIPMENT AND PROCESSES

(75) Inventors: Alan J. Wegleitner, Prosper, TX (US); Gregory Rodenroth, McKinney, TX (US); Milan Chiploonkar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 149 days.

(21) Appl. No.: 10/617,276

(22) Filed: Jul. 10, 2003

(65) Prior Publication Data

US 2005/0010466 A1 Jan. 13, 2005

(51) Int. Cl.
*G06F 19/00* (2006.01)
*G09B 19/00* (2006.01)

(52) U.S. Cl. .......................... 700/95; 434/219
(58) Field of Classification Search ............... 700/96, 700/95; 706/45; 118/719; 705/1, 9; 434/219, 434/350, 362
See application file for complete search history.

(56) References Cited

U.S. PATENT DOCUMENTS

| | | | | |
|---|---|---|---|---|
| 5,644,686 A | * | 7/1997 | Hekmatpour | 706/45 |
| 6,157,808 A | * | 12/2000 | Hollingsworth | 434/350 |
| 2002/0087345 A1 | * | 7/2002 | Bly et al. | 705/1 |
| 2003/0029383 A1 | * | 2/2003 | Ward et al. | 118/719 |
| 2004/0225390 A1 | * | 11/2004 | Keller et al. | 700/95 |
| 2004/0241627 A1 | * | 12/2004 | Delfing | 434/219 |

OTHER PUBLICATIONS

U.S. Appl. No. 60/456,688.*

* cited by examiner

*Primary Examiner*—Leo Picard
*Assistant Examiner*—Steven R. Garland
(74) *Attorney, Agent, or Firm*—Frederick J. Telecky, Jr.; W. James Brady, III

(57) ABSTRACT

A software system is provided that tracks employee and contractor operation/certification of fabrication equipment and processes is provided to ensure that only qualified personnel are allowed to process the materials. The system is real time with an auto-update features, Web enabled, dynamic tool interface with automatic record checking and reporting.

11 Claims, 7 Drawing Sheets

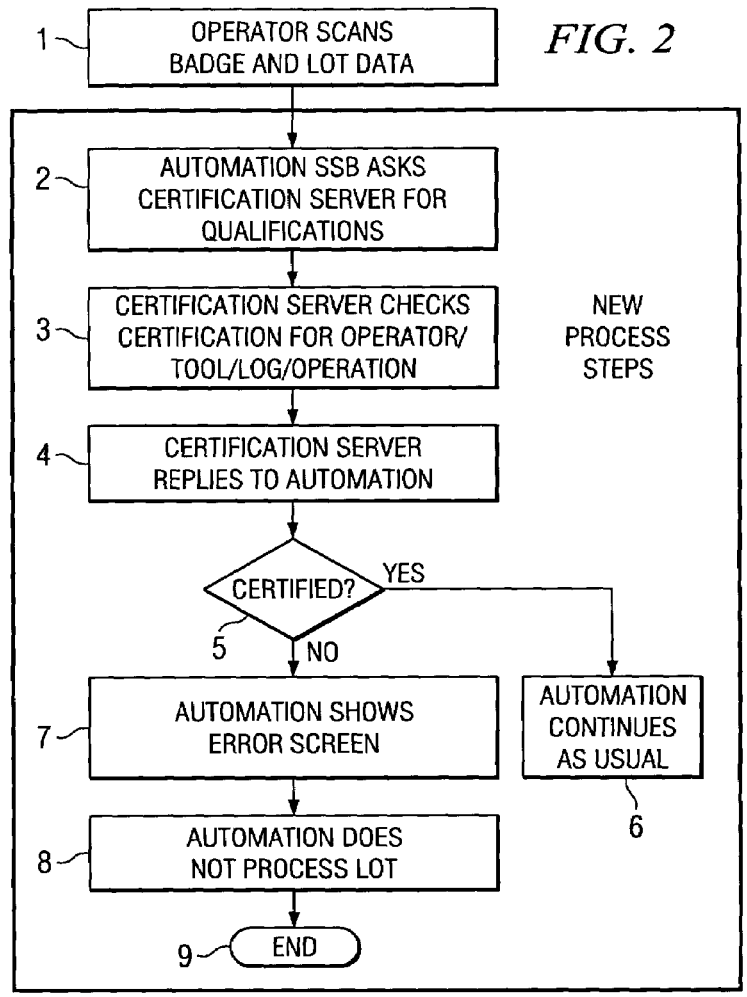

FIG. 3

Tabs: Manager | Manager | Manager | Manager | Administrator
Sub-tabs: Application Tools | Reports | Admin Tools In Training=IT   Expired Training=ET

| EMPLOYEE/ CONTRACTOR (#) | GENERAL | LING READ | F | COAT (LPT) | 8100XP | LOLES | LINE (COAT/E) | (CR202 C) | COAT/DEV | AI INSPECT | TACHI SEM | NMENT OPER | COAT/EXPOS | TENCOR |
|---|---|---|---|---|---|---|---|---|---|---|---|---|---|---|
| ALLEN (00001) | C | C | C |  | C | C | C | C |  | C | C | C | C | C |
| ASHA (00002) | IT |  |  |  |  |  |  |  |  | IT |  | IT |  |  |
| BEAVER (00003) | C | C |  |  |  |  | E+ |  |  | C | C | C |  |  |
| BUESHER (00004) | C | C | C | C | C | C | AE | AE | AE | C | C | C | C | C |
| BRICKER (00005) | C |  |  |  |  |  | E |  |  | C | E | E |  |  |
| CHEN (00006) | IT | IT |  |  |  |  |  | IT |  | C | C | C | IT | C |
| ESTES (00007) | C | C |  | IT |  | C | C | AE | C | C | AE | AE | C | IT |
| EVANS (00008) | IT |  |  |  |  |  |  |  |  | IT |  | IT |  |  |
| GARCIA (00009) | C | C |  |  | C | C |  |  |  | C | C | C | C | C |
| GILLEN (000010) | C |  |  |  |  |  | IT |  |  | C | C | C |  |  |
| HARRIS (000011) | C | E |  |  |  |  | C |  |  |  | C | AE | C | C |
| HILL (000012) | C | C |  |  | C | C | C | C |  |  |  | C | C | C |
| JENNINGS (000013) | E | E |  | IT |  |  | C | AE | C | C | C | AE |  |  |
| JIMENZ (000014) | C | IT |  |  |  |  |  |  |  | C | IT | C |  |  |
| KIMOTHO (000015) | IT | IT |  |  |  |  | IT |  |  |  |  |  |  |  |
| KOO (000016) | C | IT |  |  |  |  |  |  |  | C | C | C |  |  |
| MOODY (000017) | C | C | C | IT | C | C | C | C | C | C | C | C | C | C |
| MORDI (000018) | C | C |  | IT |  |  | C | C | C | C | C | C | C |  |
| POE (000019) | IT | IT |  |  |  |  |  |  |  | E | C | C |  | C |
| ROBERTS (000020) | C | C |  |  |  | E |  | E | E | C | E | AE | E+ |  |
| SEBASTIAN (000021) |  |  |  |  |  |  |  |  |  |  |  |  |  |  |
| STOKER (000022) | IT | IT |  |  |  |  | IT |  |  |  |  |  |  |  |
| TIJERINA (000023) | C | C |  | IT | IT | C | AE | C | C | C | C | C |  |  |
| WASHINGTON (000024) | C | E |  |  |  |  |  |  |  | C | C | C |  |  |
| WEHRMANN (000025) | IT | IT |  |  |  |  |  |  |  | C | C | C |  | C |
| TOTAL | 16 | 10 | 3 | 1 | 5 | 7 | 9 | 8 | 6 | 17 | 16 | 19 | 8 | 9 |

IT=INTRAINING
E OR ET=EXPIRED TRAINING
C=CERTIFIED

SYSTEM FOR TRACKING OPERATOR CERTIFICATION OF FAB EQUIPMENT AND PROCESSES

FIELD OF INVENTION

This invention relates to a factory manager WEB enabled wafer fabrication operations equipment operator certification, production monitoring and authorization system.

BACKGROUND OF INVENTION

A manufacturing semiconductor fabrication facility can use many tools and materials. At a Texas Instruments Incorporated there are as many as 900 tools and associated software at a single fabrication facility. The tools and materials change from time to time. A source of bad processing or scrapping customer production materials in semiconductor processing is unqualified or unauthorized individuals loading or running production/customer materials. It is highly desirable to have a system that tracks employee operations and employee certification of fabrication equipment and processes in real time format to ensure that only qualified personnel are allowed to process customer materials.

SUMMARY OF INVENTION

In accordance with one embodiment of the present invention an integrated system is provided that tracks user operation certification of fabrication equipment and processes in real time format to ensure only qualified personnel are allowed to process customer materials.

DESCRIPTION OF DRAWING

FIG. 2 is a flow diagram of the system of FIG. 1.

FIG. 3 illustrates a certification record.

FIG. 4 illustrates a screen access for user number.

FIG. 5 illustrates a screen access to select a module or tool, a process and a cadre or trainer if being trained.

DESCRIPTION OF PREFERRED EMBODIMENT

Figure 1:
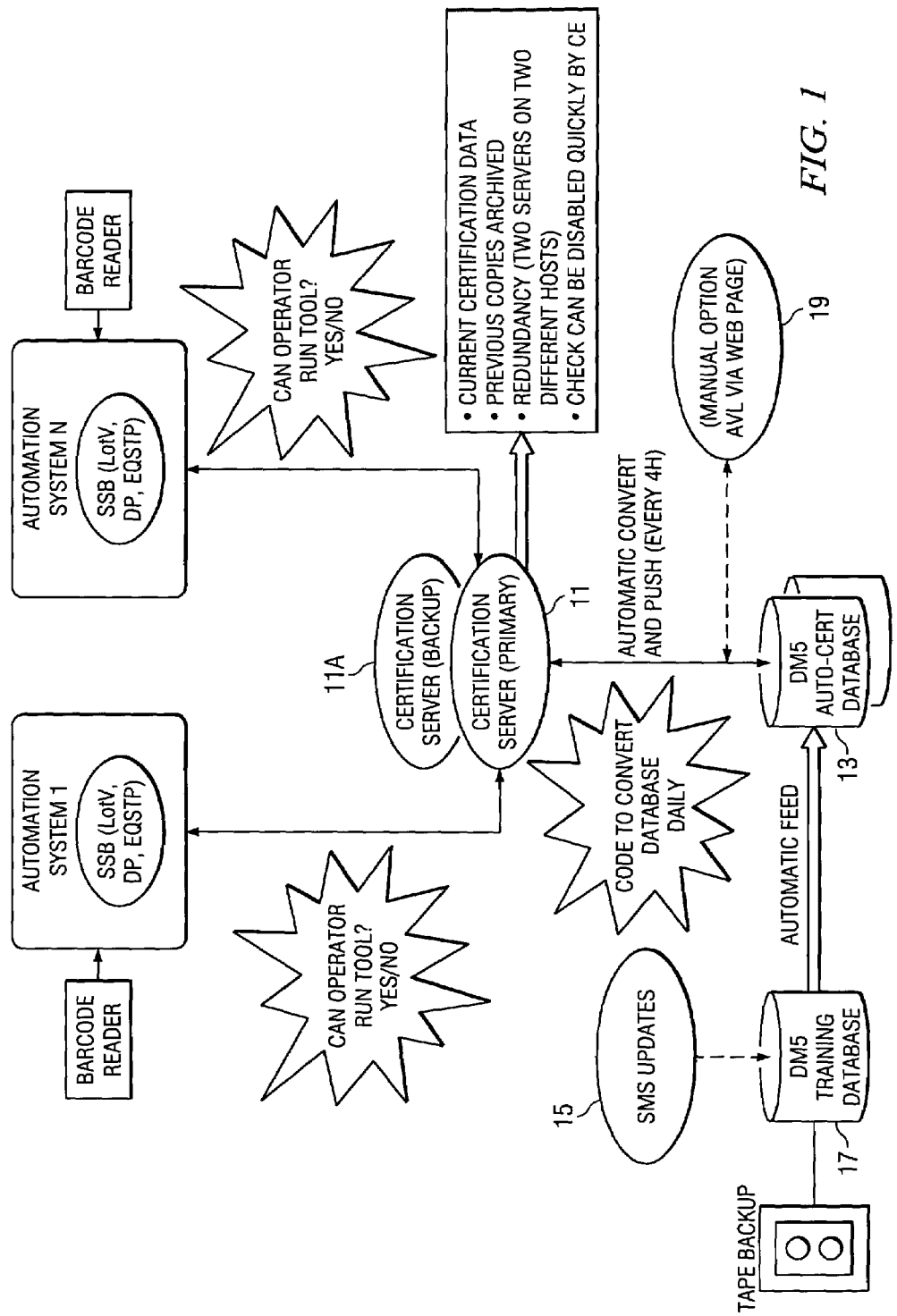
FIG. 1 illustrates the system components for tracking employee operations and certification of according to one embodiment of the present invention.

Referring to FIG. 1 there is illustrated the system components according to one embodiment of the present invention that tracks employee operations and employee and other user certification of fabrication equipment and processes in real time format to ensure that only qualified personnel are allowed to process customer materials.

Each of Automation Systems 1 thru N in FIG. 1 represents a fabrication equipment tool control system. Each automation system includes a Super Service Bundle (SSB) that identifies which tool is working on which material, which type of device and which material it can run. It also contains the log point operations or steps to build the device. Each automation control systems 1 thru N is coupled to the equipment and will lock the system from use unless the user is certified. The object is to have a system that tracks employee or contractor operations/certification of fabrication equipment and processes in real time format to ensure that only qualified personnel are allowed to process customer materials.

In accordance with an embodiment of the present invention each of the automation systems 1 through N check to determine if the requesting user of the tool or other equipment is an employee or certified contractor, if the user is qualified to run the type of tool or other equipment, to work on the device being fabricated and the material being used. The user of the tool for the process accesses the tool by, for example, passing a bar code such as on the users badge or other access card across a reader at the tool access point. The automation system (system 1 through N) with knowledge of the tool or other equipment requirements inquires at a certification server 11 to determine if the requester is certified to access the equipment. The certification server 11 checks an auto-certification database 13 to determine a match for the employee or contractor to determine if access is permitted. The database 13 contains the record of the employee or contractor and the equipment and materials and products the employee is certified to use.

Semiconductor Manufacturing System (SMS) 15 keeps tracks of a product. It contains a record of the product. It has the customer identification, device name, lot number and wafer identification. It records the log points and operations. It provides updates to a qualification database 17 which, in turn, provides daily SMS updates and qualification records to the auto-certification database 13. The updates include tool updates, material updates and user updates and certification updates and records.

Referring to FIG. 2 is illustrated the process. In Step 1 the operator scans the operators badge and lot data information for the device being made at the tool or equipment location. The Super Service Bundle (SSB) associated with each automated system or tool defines the tool the user is working on and which material. The next Step 2 is the automation system such as System 1 inquires at the certification server 11 for qualification of the user for this type of system. In Step 3 the certification server 11 checks certification for the requested operator for which tools and log point operation which is the device type, log point to build the device and the operations which is the subsets of the step to build the device. In Step 4 the certification server replies to the automation. In Step 5 the server decides if there is certification to use the tool. If the answer is "yes", certification is given and automation continues as usual in Step 6. If the answer is "no" the system shows an error screen and warning not to process lot at Steps 7 and 8 respectively and process with that user ends.

The auto-certification database 13 gets updated every four hours. The SMS updates are sent to the training database 17 and once every day this is sent to the auto-certification database 13. Certification data is uploaded automatically to the production servers for systems 1 through N on a daily basis. However, a manual "push" of the data can be performed at any time using an IMS user/password controlled web page 19. Because the certification server 11 is such a critical part of the process there is a backup secondary server 11A.

The database 17 contains personnel management information. It contains a listing of employees and contractors and their certification status on the different tools or equipment and processes. FIG. 3 illustrates a record. It lists the employee and contractor and identifies which equipment or process and identified if employee or contractor is certified, if in-training or certification has expired. The certification server 11 with the database 13 stores the certification information. It also contains training information for those who intend to be certified.

The certification server 11 contains an "In Training" access to permit access to permit a potential user to be certified via a training manager and a small group of instructors or cadre who are certified. The access to the tool through the certification server 11 may be through a web page using a training manager program. This may be by connection at manual web page option 19 or by a connection to the training database 17.

A training manager is provided that manages the training of users of the tools. The database and the certification server provide a list of cadre or peer trainers. It also has a listing of those who intend to be certified. When a user wants to be certified or to be re-certified he or she must access the system via a web page for example. A Graphical User Interface (GUI) screen access may be used. FIG. 4 illustrates a screen GUI access where an employee or contractor can enter his or her name by entering an employee or contractor number. The Screen 2 in FIG. 5 illustrates how the user may select a module or tool, a process and a cadre or trainer if being trained. The selection of the module may include a pull own menu of equipment. The selection of the process may include a pull down menu of processes. The selection of a cadre may include a pull down menu of cadres or trainers who are in the system and are certified to train before access is given to the tool.

Figure 6:
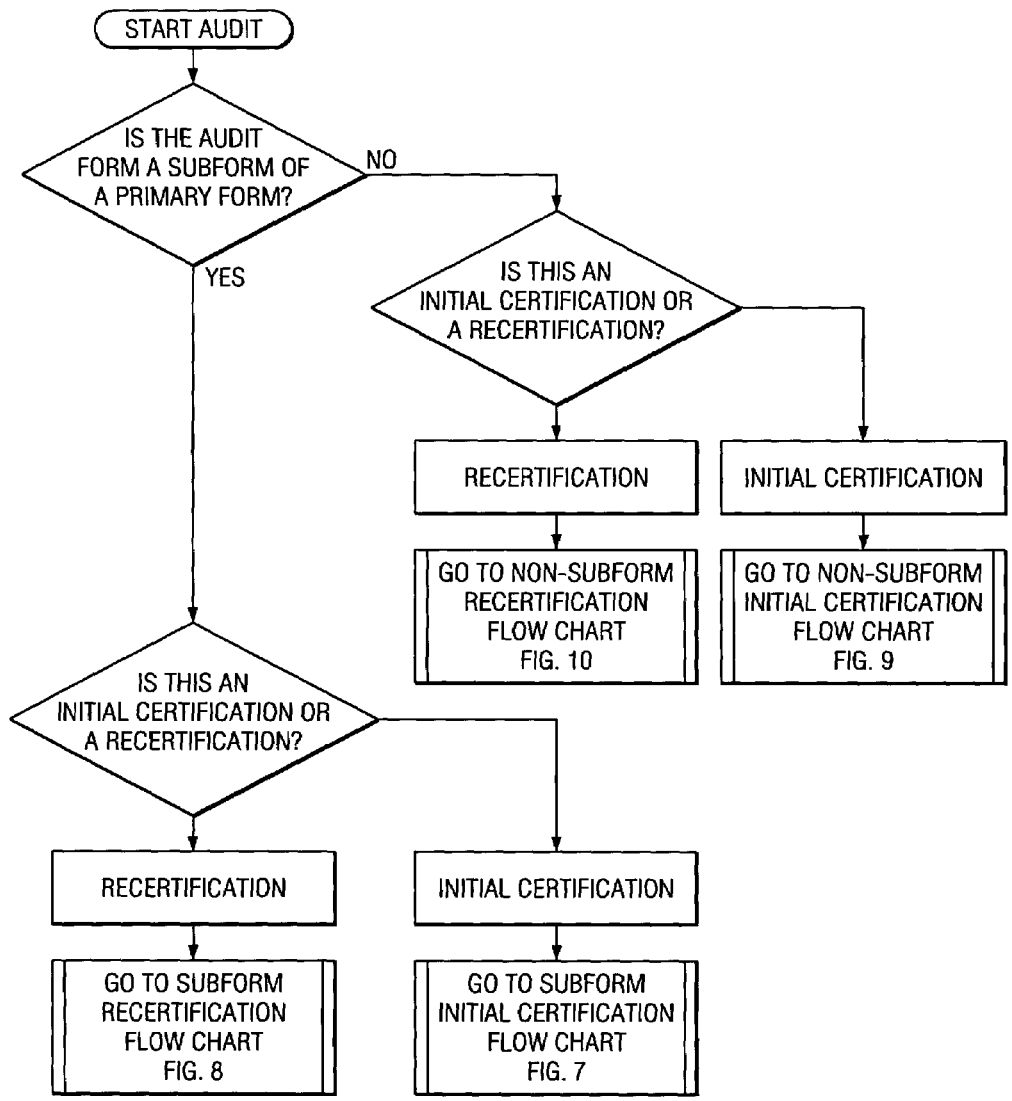
FIG. 6 illustrates the initial step steps of an audit to determine if the audit is a subform or a primary form.

The person being audited is first determined if the audit form is a subform or a primary form. See FIG. 6. The subform address unique combinations/sequences. There are devices that use a different sequence of log points and operations on a tool. An example would be a thin film process tool that has six chambers on it, each with different chemical/process steps options available. Any combination of the six could be used, i.e. there can be 720 different combinations/devices that are unique. If a primary form, then it is determined if the audit is an initial certification or a re-certification. If a subform, then it is determined if this is a re-certification or in initial certification. The system determines when re-certification is deemed necessary. The system has a time limit for completing the certification or re-certification.

Figure 7:
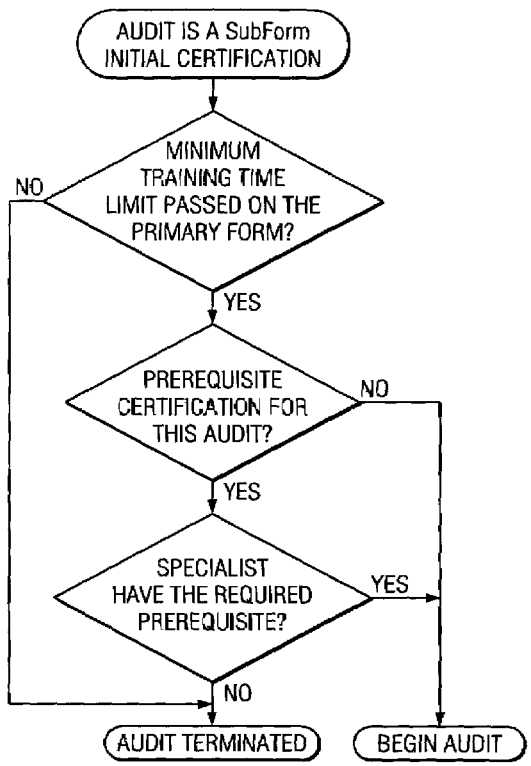
FIG. 7 illustrates the steps where the audit is a subform initial certification.

Referring to FIG. 7 there is illustrated the steps where the audit is a subform initial certification. It determines if the minimum training time limit passed on the primary form. If no, the audit is terminated. If passed (yes), it determines if there is a prerequisite certification for this audit. If not, the audit is performed. If there is a prerequisite certification, it determines if the specialist has the required prerequisite. If not the audit is terminated. If yes, the audit begins.

Figure 8:
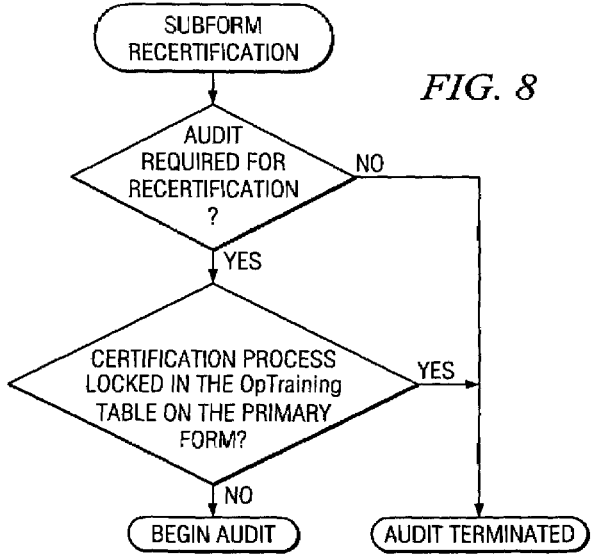
FIG. 8 illustrates the steps if a subform re-certification is to be performed.

If a subform re-certification is to be performed, the flow follows FIG. 8. It first determines if an audit is required for re-certification and, if not, the audit is terminated. If the audit for re-certification is required, it determines if the certification process is locked in an OpTraining table on a Primary Form. If yes, the audit is terminated. If no, the audit begins.

Figure 9:
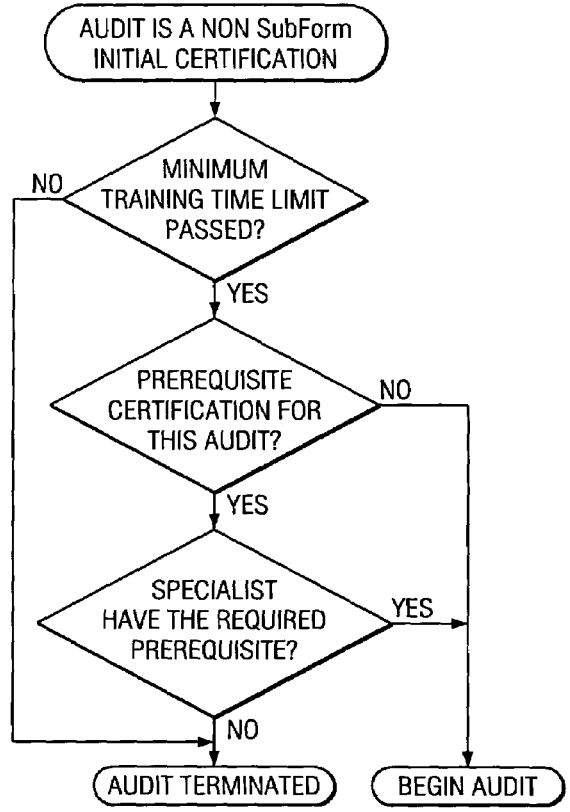
FIG. 9 illustrates the steps if the audit is a nonsubform/initial certification.

If the audit is a nonsubform/initial certification, as illustrated in FIG. 9, it is determined if the minimum training time limit is passed. If not, the audit is terminated. If "yes", then it is determined if there is a prerequisite certification for this audit. If "no", the audit is terminated. If "yes", then it is determined if there is a prerequisite certification for this audit. If "no", the audit begins. If "yes", then it is determined if the specialist has the required prerequisite. If "no", it is terminated. If "yes", the audit begins.

Figure 10:
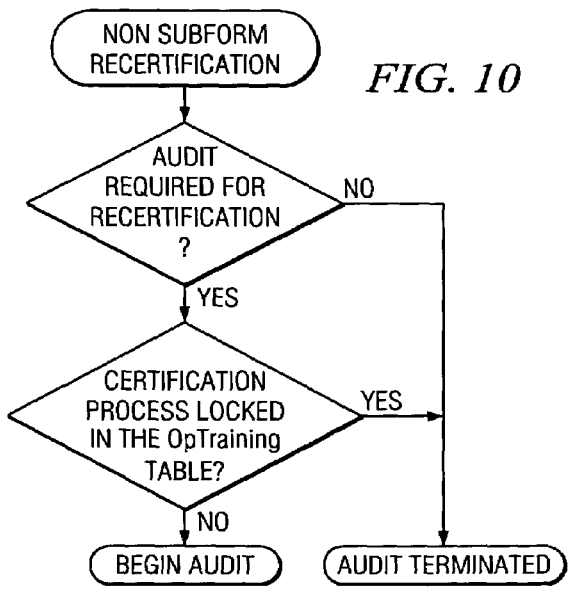
FIG. 10 illustrates the steps if the audit is a nonsubform re-certification.

If the audit is a nonsubform re-certification, it is determined if an audit is required in FIG. 10. If "no", the audit is terminated and if required it determines if the certification process is locked in the OPTraining table. If so, it is terminated and if not the audit is started.

Figure 11:
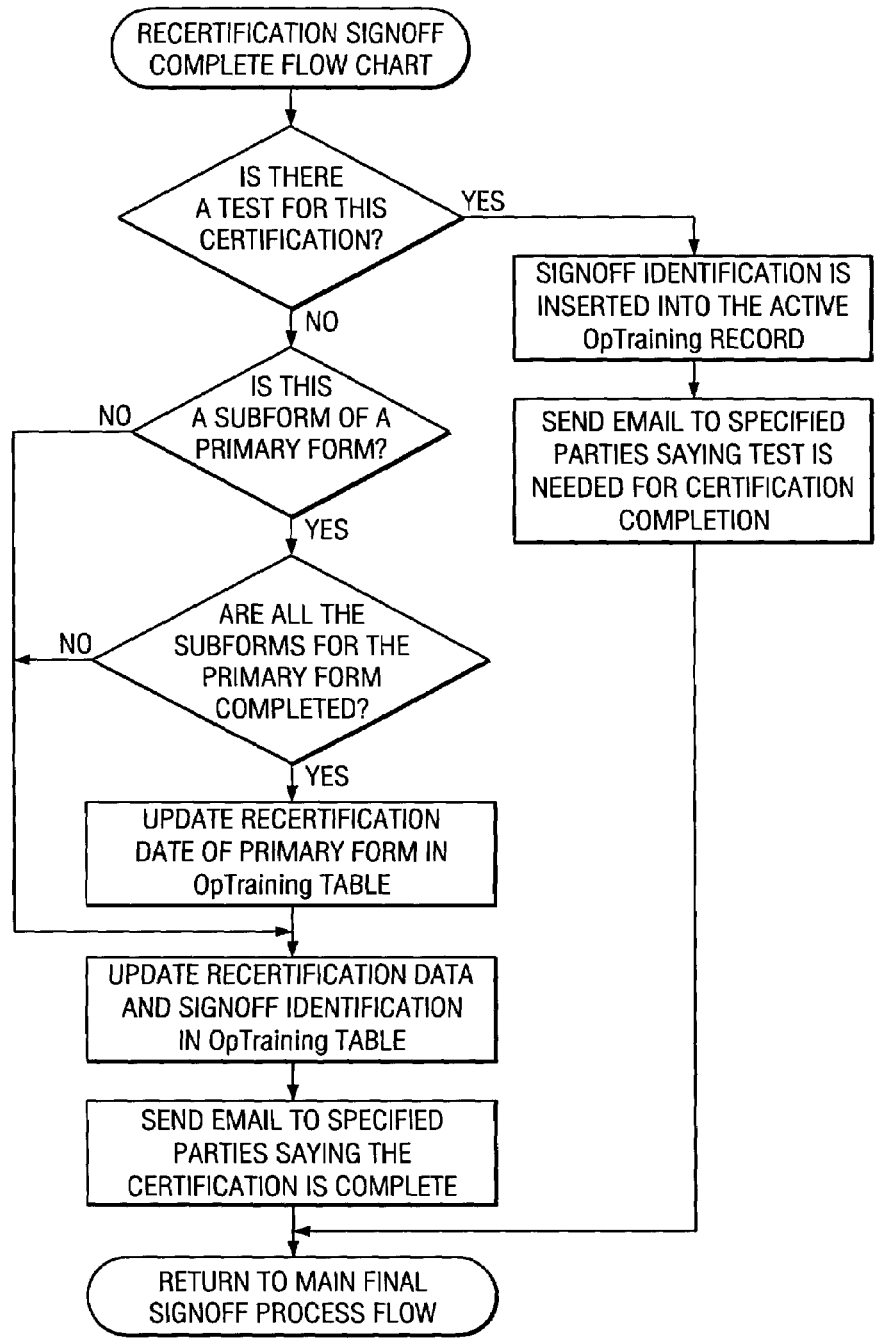
FIG. 11 illustrates the steps for final signoff entry process for re-certification.

FIG. 11 illustrates the final signoff entry process for re-certification. It first determines if there is a test for this certification. If "yes", a signoff ID is inserted into an active OpTraining record. It then sends email to specified parties saying that the test is needed for certification completion. If there is not a test, it determines if this is a subform of a primary form. If "no", it updates re-certification date and signoff ID in the OpTraining table and sends email to specified parties saying the certification is complete. If this is a subform, it is determined if all the subforms for the primary form are completed. If "yes", then update re-certification date of primary form in the OpTraining table. The system then updates re-certification date and signoff ID in the OpTraining table and sends email to specified parties saying the certification is complete.

The system also generates a report on attempts to process material by an unqualified person. Wherever a person tries to access a machine or process and that person is not certified, the certification server records the person or machine and the time and date and sends that to the database 13 and that record can be retrieved by an access point such as through the web. The system also keeps track of production from the automation systems.

While the invention has been particularly shown and described with reference to a preferred embodiment, it will be understood by those skilled in the art that various changes in form and detail may be made without departing from the spirit and scope of the invention.

The invention claimed is:

1. A method of reducing fabrication errors at a manufacturing facility having a plurality of tools and processes comprising the steps of:
   providing a certification database containing a record of certified user names and tools and/or processes the users are certified to use;
   prohibiting access to said tools and/or processes unless the user is certified according to said record at said certification database;
   said prohibiting step includes locking user access to said tools and/or processes until granting access according to said record and
   providing a training means with access for certifying and recertifying of a potential user including providing a menu of tools and processes for said potential user to be certified or recertified and providing means for selection of tools and processes for the potential user to be certified or recertified to use and providing a listing for selection of trainers who are in the database to train the potential user to be certified or recertified.

2. A system for reducing fabrication errors at a manufacturing facility having a plurality of tools and processes comprising:
   a certification database containing a record of certified user names and tools and/or processes the users are certified to use;

means for prohibiting access to said tools and/or processes unless the user is certified according to said record at said certification database, said prohibiting access means includes a certification server coupled to said database and said means for prohibiting access for locking user access to said tools or processes until granting access according to said record;

means for certifying and recertifying a potential user including providing training access and providing a menu of tools and processes for said potential user to be certified or recertified and means for selection of tools and processes and providing a listing of trainers for selection who are in the system to train before giving access to the tools or processes.

3. A system for reducing fabrication errors at a manufacturing facility having a plurality of tools and processes comprising:

a certification database containing a record of certified user names and tools and/or processes the users are certified to use;

means for prohibiting access to said tools and/or processes at a user access means unless the user is certified according to said record at said certification database, said prohibiting access means includes a certification server coupled to said database and said means for prohibiting access for locking user access to said tools or processes until granting access according to said record;

means for certifying and recertifying a potential user including means for auditing a person to be a potential user; said auditing means including means for determining if the audit is a subform or a primary form where said subform addresses devices that use unique combinations/sequences of steps to build a device and operations on a tool; and if a primary form or subform means for determining if the audit is an initial certification or recertification.

4. The system of claim 3 wherein if the audit is a subform and is an initial certification means for determining if a minimum training time limit is passed on the primary form and if not terminating the audit and if the minimum time limit is passed determining if there is a prerequisite certification for this audit and if not performing the audit and if so determining if a potential user has the required prerequisite and if not to terminate the audit and if so begin the audit.

5. The system of claim 3 wherein if the audit is a subform and a recertification is to be performed determining if an audit is required for recertification and if not terminating the audit and if an audit is required determining if the certification is locked in a table on a primary form and if so to terminate the audit and if not to begin the audit.

6. The system of claim 3 wherein if the audit is a primary certification and is an initial certification determining if a minimum training time limit is passed and if not terminating the audit and if the minimum training time has passed determining if there is a prerequisite certification for this audit and if not performing the audit and if so determining if a potential user has the required prerequisite and if not to terminate the audit and if the potential user has the required prerequisite performing audit.

7. The system of claim 3 wherein if the audit is a primary recertification determining if an audit is required and if the audit is not required terminating the audit and if determining the audit is required determining if the certification is locked in a training table and if so to terminate the audit and if not to begin the audit.

8. A method for reducing fabrication errors at a manufacturing facility having a plurality of tools and processes comprising:

providing a certification database containing a record of certified user names and tools and/or materials the users are certified to use;

prohibiting access to said tools and/or processes unless the user is certified according to said record at said certification database;

auditing a person to be a user comprising the steps of determining if the audit is a subform or a primary form where said subform addresses devices that use unique combinations/sequences of steps to build a device and operations on a tool; and if a primary form or subform determining if the audit is an initial certification or recertification.

9. The method of claim 8 wherein if the audit is a subform and an initial certification determining if a minimum training time limit is passed on the primary form and if not terminating the audit and if the minimum time limit is passed determining if there is a prerequisite certification for this audit and if not performing the audit and if so determining if a potential user has the required prerequisite and if not to terminate the audit and if so begin the audit.

10. The method of claim 8 wherein if the audit is a subform and a recertification is to be performed determining if an audit is required for recertification and if not terminating the audit and if an audit is required determining if the certification is locked in a table on a primary form and if so to terminate the audit and if not to begin the audit.

11. The method of claim 8 wherein if the audit is a primary and an initial certification determining if a minimum training time limit is passed and if not terminating the audit and if the minimum training time has passed determining if there is a prerequisite certification for this audit and if not performing the audit and if so determining if a potential user has the required prerequisite and if not to terminate the audit and if the the potential user has the required prerequisite performing audit.

* * * * *